US012769501B2

(12) United States Patent
Kanaoka et al.

(10) Patent No.: US 12,769,501 B2
(45) Date of Patent: Oct. 20, 2026

(54) SOUND OUTPUT DEVICE WITH SOUND OUTPUTTING BASED ON OBJECT APPROACH DETECTION, METHOD AND PROGRAM

(71) Applicant: KYOCERA Corporation, Kyoto (JP)

(72) Inventors: Toshikazu Kanaoka, Yokohama (JP); Shotaro Nagao, Yokohama (JP); Akito Moriwaki, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 190 days.

(21) Appl. No.: 18/741,717

(22) Filed: Jun. 12, 2024

(65) Prior Publication Data

US 2024/0419388 A1 Dec. 19, 2024

(30) Foreign Application Priority Data

Jun. 13, 2023 (JP) ................................ 2023-097309

(51) Int. Cl.

| | |
|---|---|
| ***G06F 3/16*** | (2006.01) |
| ***G10K 11/175*** | (2006.01) |
| ***G10K 11/178*** | (2006.01) |
| ***H04R 1/10*** | (2026.01) |

(52) U.S. Cl.

CPC ............ *G06F 3/16* (2013.01); *G10K 11/1752* (2020.05); *G10K 11/178* (2013.01); *H04R 1/1041* (2013.01)

(58) Field of Classification Search

CPC ...... G06F 3/16; G10K 11/178; G10K 11/175; G10K 11/1752; G10K 11/00; G10K 11/17837; G10K 11/1783; H04R 1/10; H04R 3/00; H04R 25/00; H04R 1/1041

See application file for complete search history.

(56) References Cited

U.S. PATENT DOCUMENTS

| | | | | |
|---|---|---|---|---|
| 11,184,695 | B2 * | 11/2021 | Bloom | H04R 1/1008 |
| 11,809,774 | B1 * | 11/2023 | Vitt | H04R 1/1008 |
| 2003/0103632 | A1 * | 6/2003 | Goubran | H04K 3/825<br>381/94.1 |
| 2008/0181422 | A1 * | 7/2008 | Christoph | G10K 11/17817<br>381/73.1 |
| 2019/0355341 | A1 * | 11/2019 | Steele | G10K 11/17823 |

OTHER PUBLICATIONS

Amesaka (Amezaka) et al., “Study on hand shape recognition method for hearable devices using sound leakage signals”, WISS 2022: 30th Workshop on Interactive Systems and Software, Dec. 8, 2022, pp. 1-7.

* cited by examiner

*Primary Examiner* — Paul Kim
*Assistant Examiner* — Shin Lee
(74) *Attorney, Agent, or Firm* — Studebaker Brackett PLLC

(57) ABSTRACT

A sound output device, a sound output method, and a program with improved functionality and/or usability are provided. The sound output device includes a first outputter, a second outputter, a first detector, and a controller. The first outputter is configured to output sound to one ear of a user. The second outputter is configured to output sound to the other ear of the user. The first detector is configured to detect an approach of an object in a vicinity of the first outputter. The controller is configured to cause the first outputter to output first sound including at least one of certain playback sound or certain call audio and cause the second outputter to output second sound including certain masking sound on a basis of the first detector detecting the approach of the object.

10 Claims, 13 Drawing Sheets

SOUND OUTPUT DEVICE WITH SOUND OUTPUTTING BASED ON OBJECT APPROACH DETECTION, METHOD AND PROGRAM

CROSS REFERENCES TO RELATED APPLICATIONS

The present invention contains subject matter related to Japanese Patent Application No. 2023-97309 filed in the Japan Patent Office on Jun. 13, 2023, the entire contents of which are incorporated herein by reference.

BACKGROUND OF THE INVENTION

1. Field of the Invention

The present disclosure relates to a sound output device, a sound output method, and a program.

2. Description of the Related Art

Various technologies have been proposed in relation to devices (such as wearables devices or hearable devices, for example) that output sound from earphones or the like. For example, see: [online], 8 Dec. 2022 [retrieved on 24 May 2023], Internet <URL: https://www.wiss.org/WISS2022Proceedings/data/12.pdf>, (WISS 2022: 30th Workshop on Interactive Systems and Software), non-official translation (AMESAKA, Takeshi et al. Investigation into hand shape recognition method for hearable devices using sound leakage signals.). Amesaka et al. propose a technology related to an earphone-type device capable of identifying actions (gestures), such as the user covering their ear with their hand. This technology proposes the identifying of a plurality of actions (gestures), such as the user covering their ear with their hand on the basis of a result of using a microphone to acquire the leakage of sound outputted from the earphones.

SUMMARY OF THE INVENTION

In one embodiment, a sound output device includes a first outputter, a second outputter, a first detector, and a controller. The first outputter is configured to output sound to one ear of a user. The second sound outputter is configured to output sound to the other ear of the user. The first detector is configured to detect an approach of an object in a vicinity of the first outputter. The controller is configured to cause the first outputter to output first sound including at least one of certain playback sound or certain call audio and cause the second outputter to output second sound including certain masking sound on a basis of the first detector detecting the approach of the object.

In one embodiment, a sound output device includes a first outputter, a second outputter, a first sound pickup, and a controller. The first outputter is configured to output sound to one ear of a user. The second outputter is configured to output sound to the other ear of the user. The first sound pickup is configured to pick up first external sound around the first outputter. The controller is configured to cause the first outputter to output first sound including at least one of certain playback sound or certain call audio and cause the second outputter to output second sound including certain masking sound on a basis of a certain change in the first external sound picked up by the first sound pickup.

In one embodiment, a sound output method includes: detecting, by a first detector, an approach of an object in a vicinity of a first outputter; and causing the first outputter to output first sound including at least one of certain playback sound or certain call audio and causing a second outputter to output second sound including certain masking sound on a basis of the first detector detecting the approach of the object.

In one embodiment, a program causes an electronic apparatus to execute processing including: detecting, by a first detector, an approach of an object in a vicinity of a first outputter; and causing the first outputter to output first sound including at least one of certain playback sound or certain call audio and causing a second outputter to output second sound including certain masking sound on a basis of the first detector detecting the approach of the object.

DESCRIPTION OF THE PREFERRED EMBODIMENTS

It is desirable to improve the functionality and/or usability of devices that output sound as described above (hereinafter also referred to as "sound output devices") by making further improvements to such devices. An object of the present disclosure is to provide a sound output device, a sound output method, and a program with improved functionality and/or usability. According to an embodiment, a sound output device, a sound output method, and a program with improved functionality and/or usability can be provided. The following describes embodiments according to the present disclosure, with reference to the drawings.

In the present disclosure, a "sound output device" may be an electronic apparatus that outputs sound. The "electronic apparatus" may be an apparatus driven by electric power. In the present disclosure, a "user" may be an entity (typically a human being) who uses a sound output device and/or a system including the sound output device according to an embodiment. A "system" may include an apparatus driven by electric power.

The sound output device according to an embodiment described below can continuously record the sound of a surrounding environment while outputting the sound of the surrounding environment for the user to hear. The sound output device according to an embodiment can also output the audio of a voice call for the user to hear, in the manner of a wearable device (or hearable device) used in conjunction with a mobile phone or a smartphone, for example. Upon detecting a certain gesture performed by the user's hand or the like, the sound output device according to an embodiment operates so that the playback sound or voice call outputted from the sound output device is more audible to the user.

The sound output device according to an embodiment can be implemented in any of various ways. FIGS. 1 through 4 are diagrams illustrating examples of several embodiments of a sound output device. The following describes sound output devices according to several embodiments, with reference to FIGS. 1 through 4.

Figure 1:
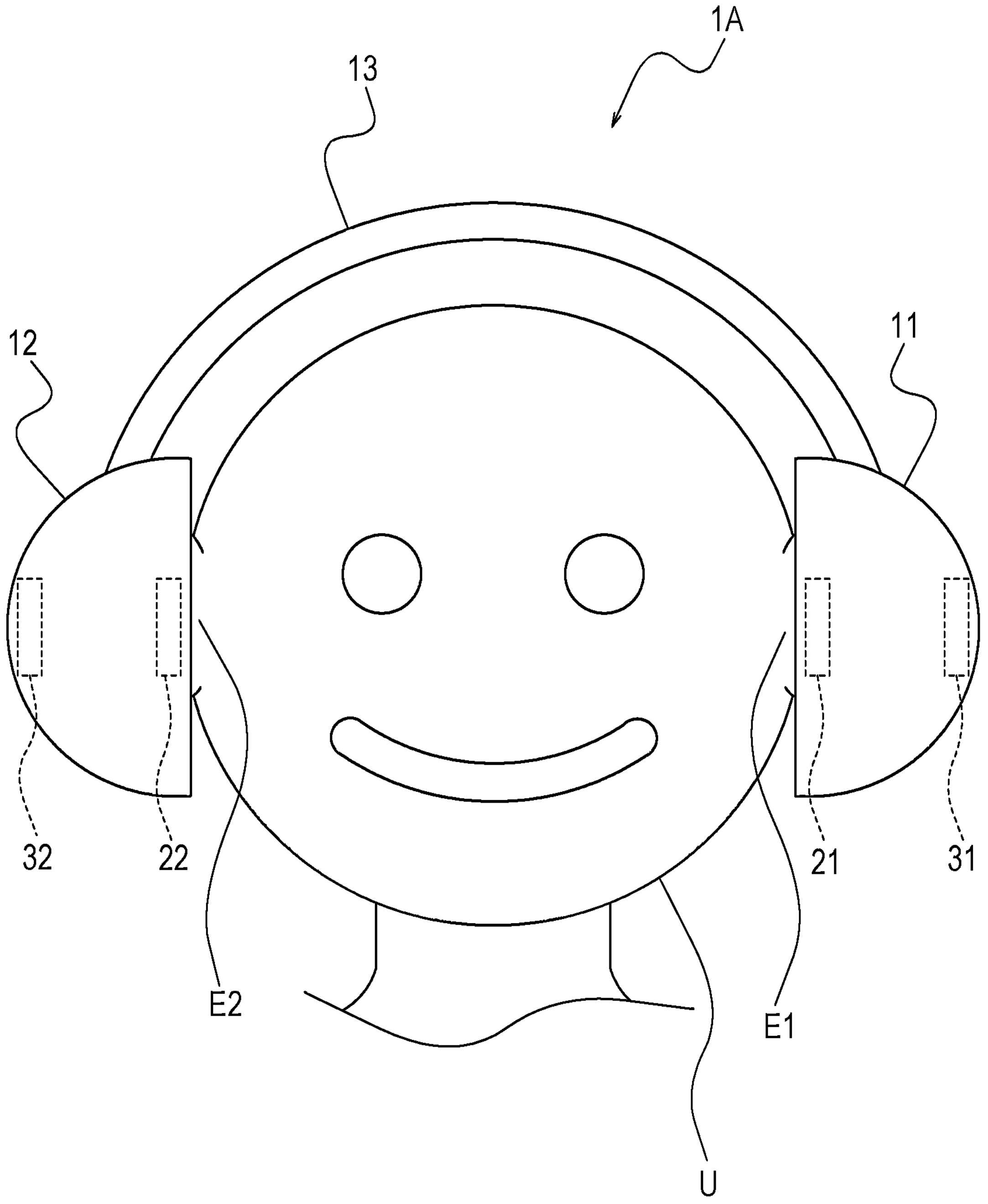
FIG. 1 is a diagram illustrating an example of a usage pattern of a sound output device according to an embodiment.

A sound output device 1A according to the embodiment illustrated in FIG. 1 can be configured as a headphone-type electronic apparatus. A sound output device 1B according to the embodiment illustrated in FIG. 2 can be configured as an electronic apparatus such as inner-ear earphones or canal earphones. A sound output device 1C according to the embodiment illustrated in FIG. 3 can be configured as an electronic apparatus such as bone conduction earphones. A sound output device 1D according to the embodiment illustrated in FIG. 4 can include a configuration that is at least partially the same and/or similar to the sound output device 1B according to the embodiment illustrated in FIG. 2, and can form a system that cooperates with another electronic apparatus (a smartphone 100, for example).

The sound output device 1A illustrated in FIG. 1 includes a left-side housing 11, a right-side housing 12, and a headband 13, for example. The left-side housing 11 and the right-side housing 12 are connected through the headband 13. That is, the left-side housing 11 and the right-side housing 12 are respectively connected to the two ends of the headband 13. When the user wears the sound output device 1A, the left-side housing 11 is disposed in contact with the left ear E1 of the user U. The left-side housing 11 is used to output sound for the left ear E1 of the user U to hear. When the user wears the sound output device 1A, the right-side housing 12 is disposed in contact with the right ear E2 of the user U. The right-side housing 12 is used to output sound for the right ear E2 of the user U to hear.

In the sound output device 1A illustrated in FIG. 1, the headband 13 is disposed along the left and right ears from near the top of the head of the user U. However, another type of band may also be used instead of the headband 13, such as a band disposed near the back of the head or the forehead of the user U, or a neckband located near the neck of the user U, for example. The sound output device 1A may have the same and/or similar configuration as over-ear, on-ear, open-air, or another type of headphones. The sound output device 1A may have the same and/or similar configuration as a headset, for example.

As illustrated in FIG. 1, the left-side housing 11 of the sound output device 1A includes a first outputter 21 and a first detector 31.

The first outputter 21 is disposed facing the left ear E1 of the user U, so that sound is outputted toward the left ear E1 of the user U. The first outputter 21 may include a dynamic speaker such as any type of speaker (loudspeaker).

The first detector 31 is disposed in the vicinity of the first outputter 21. The first detector 31 may be disposed in the vicinity of the left ear E1 of the user U wearing the sound output device 1A. The first detector 31 may include a microphone that picks up the sound of the surrounding environment of the left-side housing 11, for example. The first detector 31 may be an acoustic apparatus that receives sound as air vibration using a diaphragm or the like, and converts the received sound into an electrical signal.

As illustrated in FIG. 1, the right-side housing 12 of the sound output device 1A includes a second outputter 22 and a second detector 32.

The second outputter 22 is disposed facing the right ear E2 of the user U, so that sound is outputted toward the right ear E2 of the user U. The second outputter 22 may include a dynamic speaker such as any type of speaker (loudspeaker).

The second detector 32 is disposed in the vicinity of the second outputter 22. The second detector 32 may be disposed in the vicinity of the right ear E2 of the user U wearing the sound output device 1A. The second detector 32 may include a microphone that picks up the sound of the surrounding environment of the right-side housing 12, for example. The second detector 32 may be an acoustic apparatus that receives sound as air vibration using a diaphragm or the like, and converts the received sound into an electrical signal.

Figure 2:
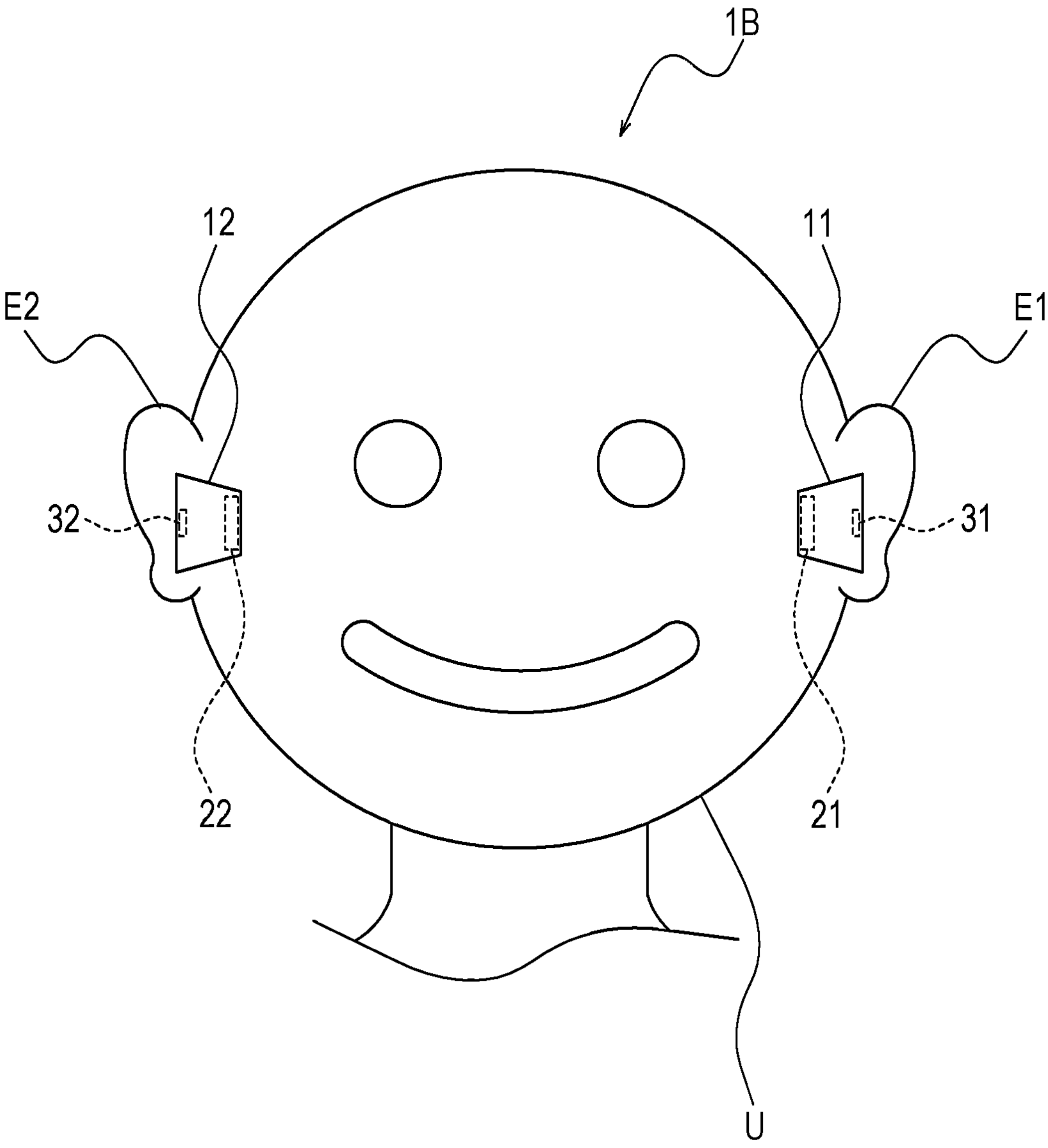
FIG. 2 is a diagram illustrating an example of a usage pattern of a sound output device according to an embodiment.

The sound output device 1B illustrated in FIG. 2 includes a left-side housing 11 and a right-side housing 12, for example. Unlike the sound output device 1A illustrated in FIG. 1, the sound output device 1B illustrated in FIG. 2 does not include a headband 13. In the sound output device 1B, the left-side housing 11 and the right-side housing 12 may be connected in a wired and/or wireless way. When the user wears the sound output device 1B, the left-side housing 11 is disposed in the left ear E1 of the user U. The left-side housing 11 is used to output sound for the left ear E1 of the user U to hear. When the user wears the sound output device 1B, the right-side housing 12 is disposed in the right ear E2 of the user U. The right-side housing 12 is used to output sound for the right ear E2 of the user U to hear. In the sound output device 1B illustrated in FIG. 2, the sound output device 1 may have the same and/or similar configuration as clip-on earphones, inner-ear earphones, or canal earphones. The sound output device 1B may have the same and/or similar configuration as an earset, for example.

As illustrated in FIG. 2, the left-side housing 11 of the sound output device 1B includes a first outputter 21 and a first detector 31. As illustrated in FIG. 1, the right-side housing 12 of the sound output device 1A includes a second outputter 22 and a second detector 32. These functional units may be based on the same and/or similar concepts as the sound output device 1A illustrated in FIG. 1.

Figure 3:
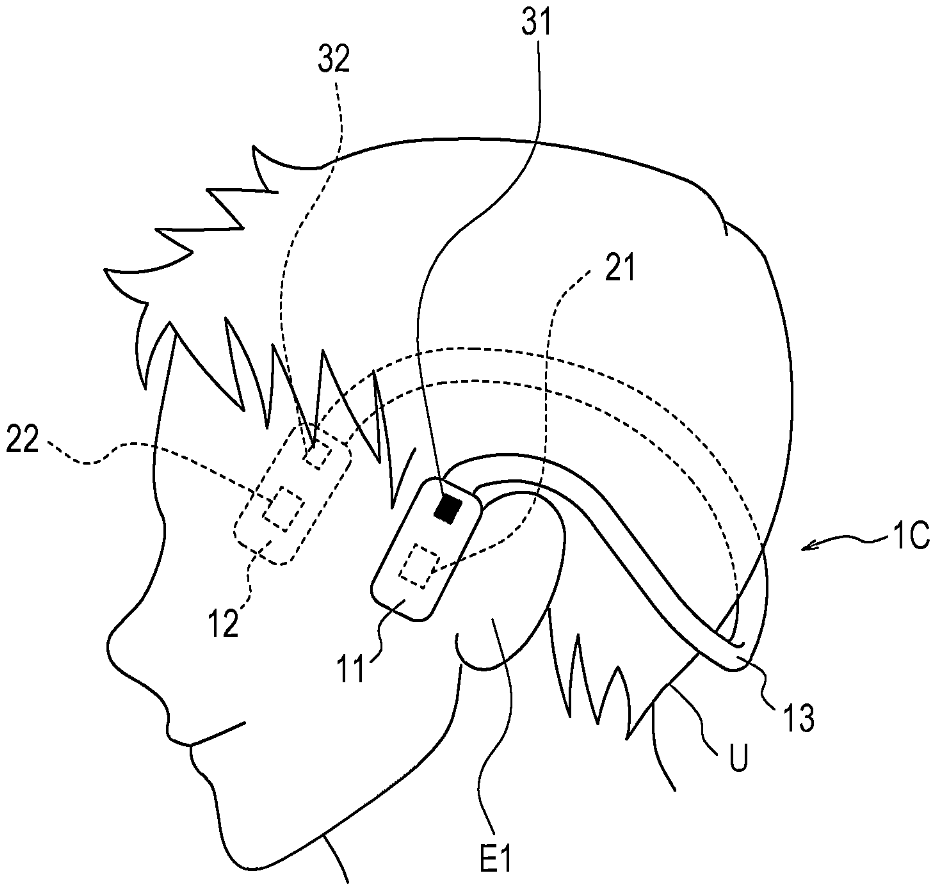
FIG. 3 is a diagram illustrating an example of a usage pattern of a sound output device according to an embodiment.

The sound output device 1C illustrated in FIG. 3 includes a left-side housing 11, a right-side housing 12, and a headband 13, for example. The left-side housing 11 and the right-side housing 12 are connected through the headband 13. That is, the left-side housing 11 and the right-side housing 12 are respectively connected to the two ends of the headband 13. When the user wears the sound output device 1C, the left-side housing 11 may be disposed at a position relatively close to the left ear E1 of the user U. The left-side housing 11 is used to output sound for the left ear E1 of the user U to hear. When the user wears the sound output device 1C, the right-side housing 12 may be disposed at a position relatively close to the right ear E2 of the user U. The right-side housing 12 is used to output sound for the right ear E2 of the user U to hear. As illustrated in FIG. 3, in the sound output device 1C, the left-side housing 11 and/or right-side housing 12 may not be disposed to cover the ear(s) of the user U (or may not be disposed over the ear(s) of the user U).

In the sound output device 1C illustrated in FIG. 3, the headband 13 is disposed along the left and right ears from near the back of the head of the user U. However, the headband 13 may also be a band disposed near the top of the head or the forehead of the user U, for example.

As illustrated in FIG. 3, the left-side housing 11 of the sound output device 1C includes a first outputter 21 and a first detector 31. The right-side housing 12 of the sound output device 1C includes a second outputter 22 and a second detector 32.

In the sound output device 1C, the first outputter 21 and the second outputter 22 may each be a bone conduction earphone (bone conduction speaker). In this case, the first outputter 21 and the second outputter 22 need not be disposed over, or in the immediate vicinity of, the left ear E1 and the right ear E2, respectively, of the user U. Each of the first outputter 21 and the second outputter 22 may not be inserted into the ear hole, external auditory canal, or the like of the user U.

In the sound output device 1C, the first detector 31 and the second detector 32 may be based on the same and/or similar concepts as the sound output device 1A illustrated in FIG. 1.

The sound output device 1A, sound output device 1B, and sound output device 1C above are each described as operating or functioning in a standalone way. However, another electronic apparatus may also be responsible for a portion of the functions in each of the sound output device 1A, sound output device 1B, and sound output device 1C.

Figure 4:
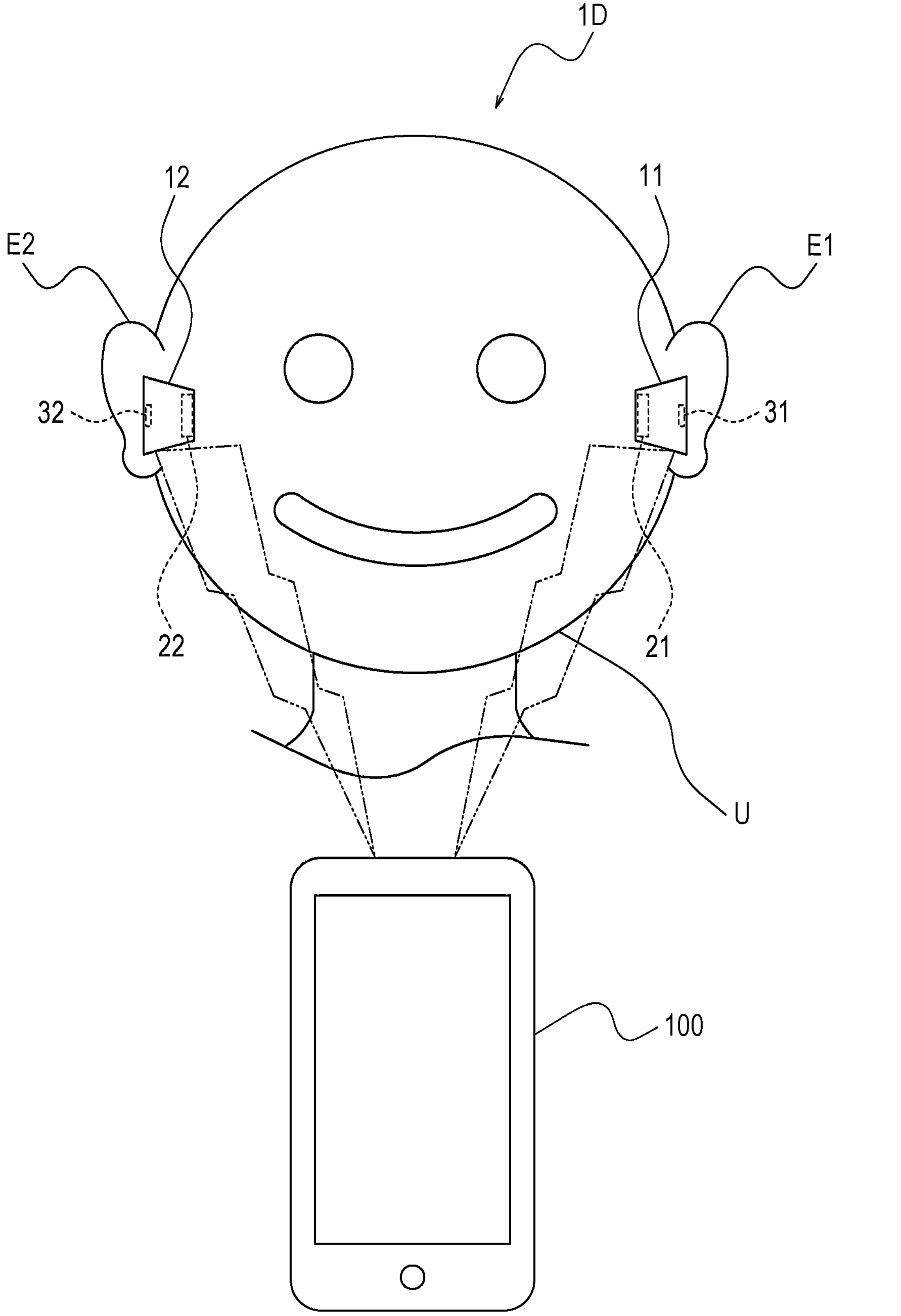
FIG. 4 is a diagram illustrating an example of a usage pattern of a system including a sound output device according to an embodiment.

The sound output device 1D illustrated in FIG. 4 may include a configuration that is at least partially the same and/or similar to the sound output device 1B illustrated in FIG. 2. The sound output device 1D may be connected in a wired and/or wireless way to another electronic apparatus, such as a smartphone 100, for example. For example, the sound output device 1D can cooperate with the smartphone 100 by wirelessly pairing with the smartphone 100. For example, the sound output device 1D can cause the user to aurally perceive sound, such as music and/or voice, played by the smartphone 100. The sound output device 1D can also cause the user to aurally perceive sound, such as the audio of a phone call by the smartphone 100.

The sound output device 1A, sound output device 1B, sound output device 1C, and sound output device 1D described above may be collectively referred to as the "sound output device 1", as appropriate.

Figure 5:
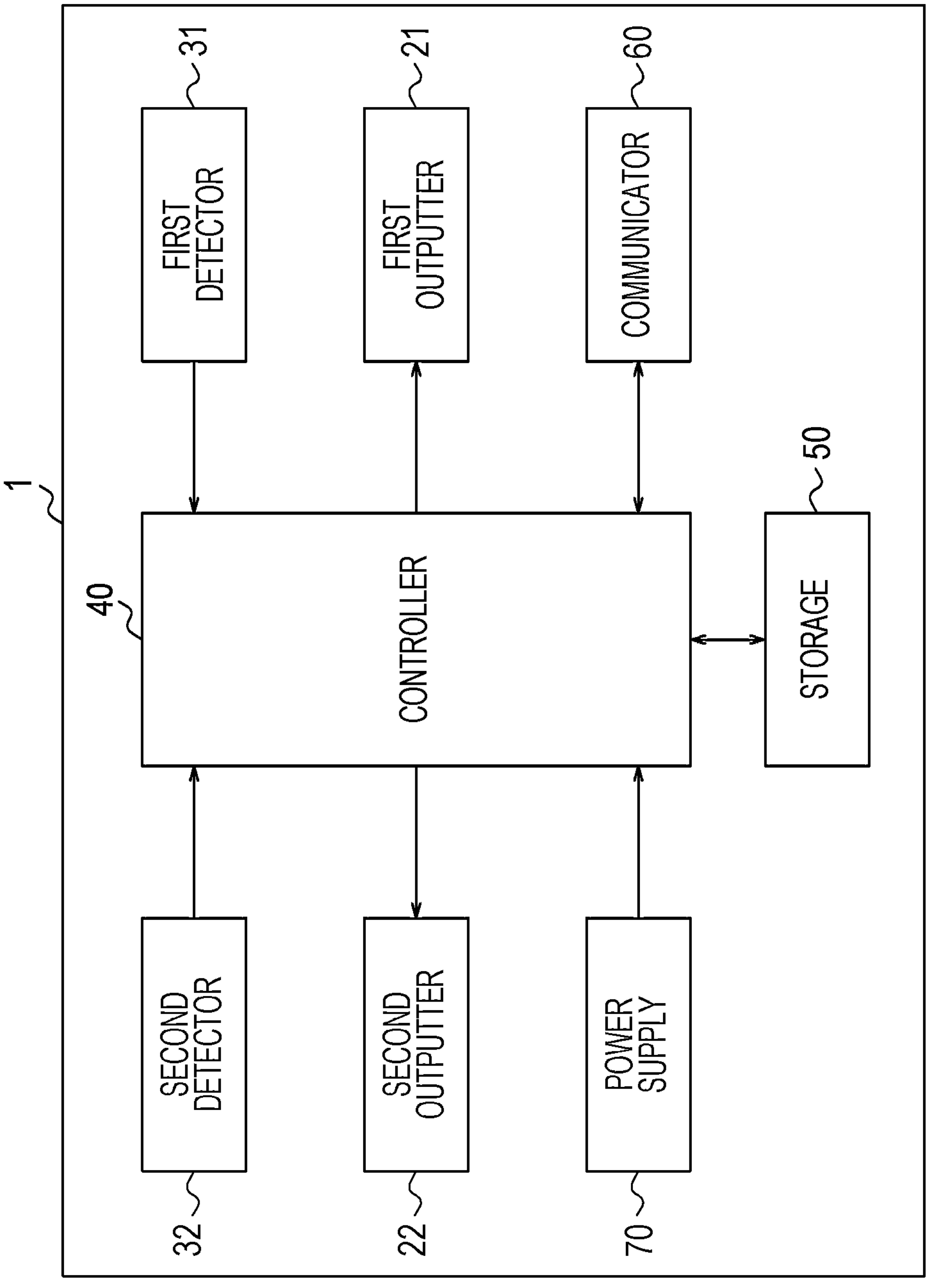
FIG. 5 is a block diagram illustrating a functional schematic configuration of a sound output device according to an embodiment.

FIG. 5 is a block diagram schematically illustrating a functional configuration of the sound output device 1 described above.

As illustrated in FIG. 5, the sound output device 1 may include a first outputter 21, a second outputter 22, a first detector 31, a second detector 32, a controller 40, storage 50, a communicator 60, and a power supply 70. As illustrated in FIG. 5, the sound output device 1 may include a first outputter 21, a second outputter 22, a first detector 31, a second detector 32, a controller 40, storage 50, a communicator 60, and a power supply 70. In one embodiment, the sound output device 1 may not include some of the functional units illustrated in FIG. 5, and may also include functions other than the functional units illustrated in FIG. 5.

The first outputter 21 and the second outputter 22 output aurally perceivable information, such as voice, to the user U. As described above, the first outputter 21 and/or the second outputter 22 may include any type of speaker. As described above, the first outputter 21 and/or the second outputter 22 may include any type of bone conduction earphone(s). The first outputter 21 and the second outputter 22 may be any type of functional unit that outputs aurally perceivable information to the user U as air-conducted sound, bone-conducted sound, and/or the like. In this way, the first outputter 21 outputs sound for one ear (for example, the left ear E1) of the user U to perceive. The second outputter 22 outputs sound for the other ear (for example, the right ear E2) of the user U to perceive.

The first detector 31 and the second detector 32 may be any type of functional unit capable of detecting the approach of an object, such as the hand (palm or fingers) of the user, for example, in the vicinity of the first outputter 21 and the second outputter 22, respectively. For example, as described above, the first detector 31 and the second detector 32 may include a microphone that picks up the sound of the surrounding environment of the left-side housing 11 and the right-side housing 12, respectively. Later, this specification further describes a manner of detecting the approach of an object such as a hand of the user in the case where the first detector 31 and/or second detector 32 include a microphone.

The first detector 31 and/or second detector 32 may also include any type of proximity sensor, for example, instead of a microphone. The first detector 31 and/or second detector 32 may further include any type of proximity sensor, for example, in addition to a microphone. Later, this specification further describes such configurations.

The controller 40 controls and/or manages the sound output device 1 overall, including each functional unit that forms the sound output device 1. The controller 40 can include a central processing unit (CPU) or a digital signal processor (DSP), for example. In one embodiment, the controller 40 may include, for example, a CPU (hardware) and a program (software) to be executed by the CPU. The controller 40 may also include storage (memory) required for operations by the controller 40, as appropriate.

The controller 40 may also include at least one processor to provide control and processing power for performing various functions. Depending on various embodiments, the at least one processor may be realized as a single integrated circuit (IC) or as multiple, communicatively connected integrated circuits and/or discrete circuits. The at least one processor can be realized according to any of various known technologies.

In one embodiment, the processor includes one or more circuits or units configured to perform one or more data computation procedures or processes. For example, the processor may include one or more processors, controllers, microprocessors, microcontrollers, application-specific integrated circuits (ASICs), digital signal processors, programmable logic devices, field-programmable gate arrays, any combination of these devices or configurations, or a combination of other known devices and configurations, and thereby perform the functions described below.

The storage 50 stores information acquired from the controller 40, the communicator 60, and/or the like. The storage 50 also stores a program to be executed by the controller 40, and the like. Otherwise, the storage 50 also stores various data such as the result of computation by the controller 40, for example. The storage 50 may further include a working memory or the like to be used when the controller 40 operates. In one embodiment, the storage 50 may include any type of a buffer, such as a ring buffer, for example. The storage 50 can be configured as a semiconductor memory or a magnetic disk, for example, but is not limited thereto, and can be any storage device. For example, the storage 50 may be an optical storage device such as an optical disc, and may also be a magneto-optical disc or the like. As another example, the storage 50 may be a storage medium such as a memory card inserted into the sound output device 1 according to the present embodiment. The storage 50 may also be an internal memory of a CPU to be used as the controller 40.

In one embodiment, the storage 50 may store sound detected by the first detector 31 and/or the second detector 32 as data. In one embodiment, sound stored as data in the storage 50 may be outputted from the first outputter 21 and/or the second outputter 22 in response to a user operation or the like.

The communicator 60 is capable of realizing various functions, including wireless communication. The communicator 60 may realize communication in accordance with any of various communication schemes such as Long Term Evolution (LTE). The communicator 60 may include a modem that supports a communication scheme standardized by the International Telecommunication Union Telecommunication Standardization Sector (ITU-T), for example. The communicator 60 may use an antenna, for example, to communicate wirelessly over a network with an external apparatus such as an external server or a cloud server. In one embodiment, the communicator 60 may receive various information from an external database in an external server or a cloud server, for example. Various information received by the communicator 60 in this way may also be stored in the storage 50. In one embodiment, the communicator 60 may receive from another electronic apparatus the data of sound and/or call audio to be output from the sound output device 1.

The communicator 60 is not limited to a functional unit that communicates wirelessly. For example, the communicator 60 may also be configured as an interface for establishing a wired connection, via a cable or the like, with an external apparatus such as another electronic apparatus.

The power supply 70 includes, for example, a lithium-ion battery, a control circuit for charging and discharging the lithium-ion battery, and the like, and supplies power to the entirety of the sound output device 1. The power supply 70 is not limited to a secondary battery such as a lithium-ion battery, and may also include a primary battery such as a button cell. The power supply 70 may also be a functional unit for receiving a supply of power from outside the sound output device 1, for example, rather than from a primary battery or a secondary battery.

As described above, in a system like the one illustrated in FIG. 4, for example, another electronic apparatus may be responsible, at least in part, for at least some functions among the functional units of the sound output device 1D, such as the controller 40, the storage 50, and the communicator 60.

The following describes operations by the sound output device 1 according to an embodiment.

In one embodiment, normal use of the sound output device 1 may be to also serve the function of ordinary headphones or earphones, for example.

For example, the controller 40 may cause the first outputter 21 and/or the second outputter 22 to output sound such as music and/or voice stored as data in the storage 50. The sound output device 1 may also cause the first outputter 21 and/or the second outputter 22 to output sound such as music and/or voice received as data via the communicator 60. The sound output device 1 may also cause the first outputter 21 and/or the second outputter 22 to output sound such as call audio received as data via the communicator 60.

In this case, the controller 40 may cause the first outputter 21 and/or the second outputter 22 to output sound with a waveform of inverse phase to the waveform of the sound of the surrounding environment acquired by the first detector 31 and/or the second detector 32 functioning as a microphone (noise canceling). The controller 40 may cause the sound with a waveform of inverse phase to the waveform of the sound of the surrounding environment described above to be superimposed onto music and/or voice and outputted, or to be outputted without being superimposed onto music and/or voice (as an effect of noise canceling only). The controller 40 may also cause the first outputter 21 and/or the second outputter 22 to output the sound of the surrounding environment acquired by the first detector 31 and/or the second detector 32 functioning as a microphone, either directly or after being appropriately processed (ambient sound).

The following assumes a situation at an airport or a train station, for example, in which a broadcast that the user should pay attention to is played while the user is using the sound output device 1. For example, when the user is waiting to board an airplane in an airport lobby or the like while using (wearing) the sound output device 1, a broadcast of a boarding announcement may be played for the airplane that user is scheduled to board. As another example, when the user is waiting to board a train on a platform, in a waiting room, or the like of a station while using (wearing) the sound output device 1, a broadcast may be played inside the station for the train that the user is schedule to board.

The sound output device 1 that the user is using may be outputting music or broadcasting, outputting the call audio of a phone call, and/or exhibiting a noise canceling effect, for example. The sound output device 1 that the user is using may also be outputting the sound of the surrounding environment (ambient sound) picked up by external sound acquisition, or not outputting any sound at all, for example.

In such a situation, if the user is using the sound output device 1, the user conceivably could fail to hear information that the user should pay attention to. This is because, for example, if the sound output device 1 is outputting music, voice, or the like, the sound thereof will drown out the sound of the surrounding environment and prevent the sound of the surrounding environment from entering the ears of the user. As another example, when the user is engrossed in another task, the user possibly could fail to hear information that the user should pay attention to, even if the sound output device 1 is not outputting music, voice, or the like. Furthermore, even if the sound of the surrounding environment enters the ears of the user, the user could still fail to hear information that the user should pay attention to because the user is not directing their attention (awareness) to the sound at that point in time.

In one embodiment, by storing the sound of the surrounding environment acquired by the first detector 31 and/or the second detector 32 in the storage 50, the user of the sound output device 1 can, with a simple operation, listen again to the sound of the surrounding environment that the user failed to hear (or may have failed to hear) in situations like those described above. Specifically, in one configuration, when the user feels as though they have failed to hear information that they should pay attention to, the user can operate the sound output device 1 to listen again to the sound from a few seconds ago. In another configuration, when information that the user should pay attention to is registered in advance in the sound output device 1, the controller 40 automatically plays the sound at the appropriate point. Consequently, in one embodiment, the sound output device 1 can have improved functionality and/or usability.

Figure 6:
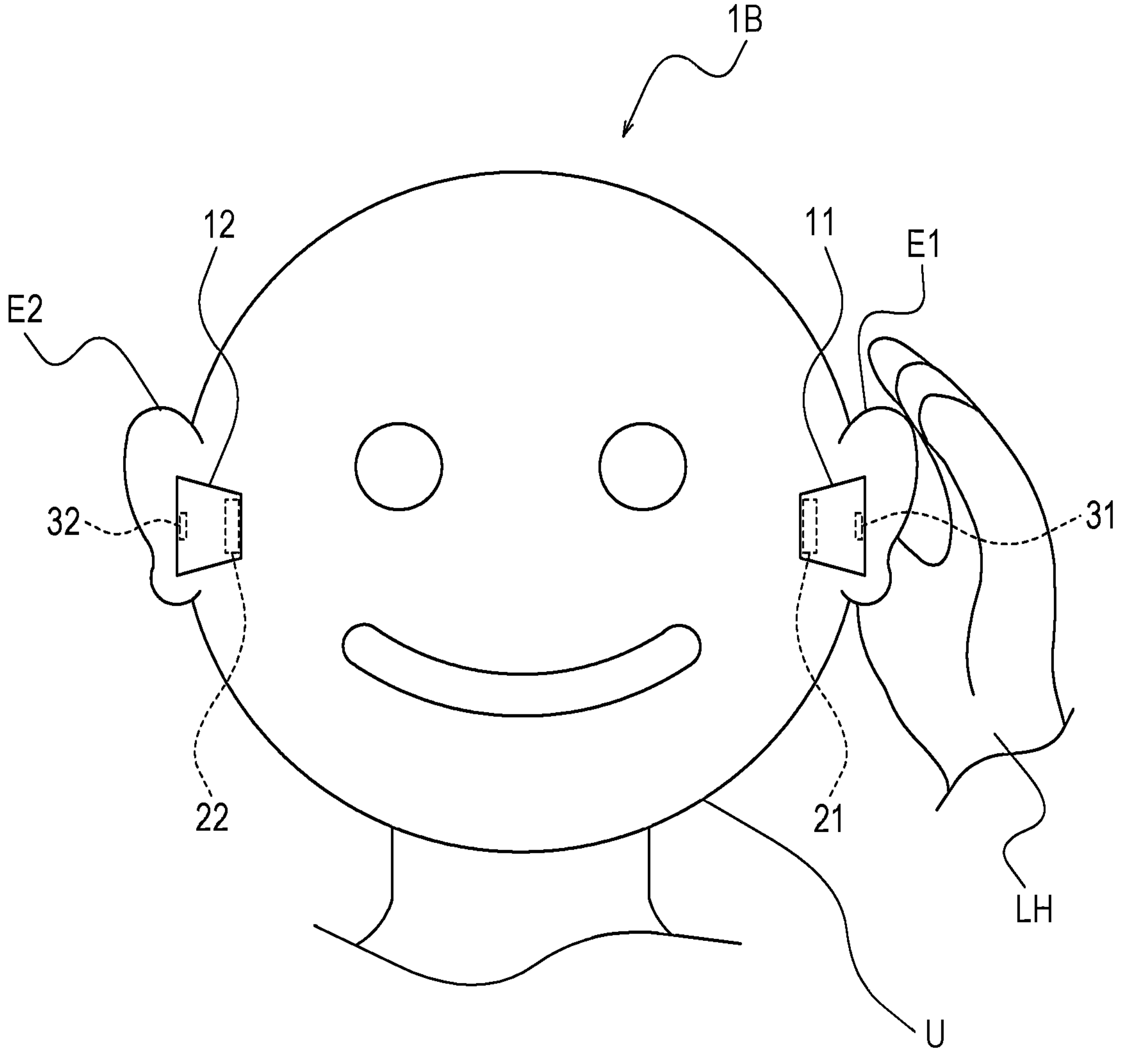
FIG. 6 is a diagram illustrating an example of a usage pattern of a sound output device according to an embodiment.

In general, humans naturally tend to make gestures such as covering or blocking their ears with their hands, fingers, or the like when they feel that sound they are hearing is bothersome, for instance. As an example, suppose a situation in which the user U is wearing and using the sound output device 1B, as illustrated in FIG. 6. In this situation, the sound output device 1B is assumed to be outputting sound such as music or voice from the first outputter 21. The left ear E1 of the user U aurally recognizes the sound outputted from the first outputter 21. In such circumstances, when the user U feels that the sound coming in from the left ear E1 for example, is bothersome, the user U makes a gesture of covering or blocking the bothersome ear (in this case, the left ear E1) with their hand, fingers, or the like. In such a situation, the user U may also be informed in advance to make such a gesture.

Another example may be supposed in which the sound output device 1B is not outputting sound such as music or voice from the first outputter 21. In such a case, the user U may be informed in advance to make a gesture of covering or blocking the ear they want to hear from (for example, the ear E1) with their hand, fingers, or the like when the user U feels that they may have failed to hear the sound of the surrounding environment that they should pay attention to.

FIG. 6 illustrates the user U making a gesture of covering or blocking the left ear E1 with their left hand LH. In this case, the left hand LH of the user U covers the first detector 31 of the left-side housing 11 of the sound output device 1. Consequently, as described later, the first detector 31 can detect the approach of the hand of the user U. When the left hand LH of the user U covers the left ear E1 as illustrated in FIG. 6, the sound of the surrounding environment less readily enters the left ear E1 of the user U.

Accordingly, such a gesture by the user U triggers the controller 40 to play and output the sound of the surrounding environment acquired by the first detector 31 and/or the second detector 32 up to that point as sound from the first outputter 21.

When triggered by a gesture by the user U, the controller 40 may play the sound of the surrounding environment from a point in time such as five seconds earlier, for example. How far back in time the gesture by the user U triggers the playback of the sound of the surrounding environment may be set appropriately according to the use, intended use, or the like of the sound output device 1. To play the sound of the surrounding environment from a slightly earlier point in time, the controller 40 may continuously store in the storage 50 the data of sound acquired by the first detector 31 and/or the second detector 32.

As another example, the user U could also make a gesture of covering the left ear E1 with the left hand LH in cases such as when the user U is engaged in a phone call using the sound output device 1. In such cases, the controller 40 may output the sound of the voice call from the first outputter 21 directly, slightly amplified, or the like instead of playing sound based on data acquired by the first detector 31 and/or the second detector 32 and stored in the storage 50.

Hereinafter, sound that includes at least one of certain playback sound or certain call audio as described above is also referred to as "first sound" out of convenience.

In the operations described using FIG. 6, the user U does not make a gesture of covering the other ear (right ear E2) with their hand or the like. Therefore, the sound of the surrounding environment could enter the right ear E2 of the user U. For example, in the case where the right-side housing 12 of the sound output device 1B illustrated in FIG. 6 includes a second outputter 22 of the canal type, the second outputter 22 is inserted to fit snugly into the ear hole of the right ear E2 of the user U. However, even in such a case, the sound of the surrounding environment conceivably may enter the right ear E2 of the user U, albeit faintly. In the case where the second outputter is outputting the sound of the surrounding environment acquired by the second detector 32, the user U conceivably feels that the sound of the surrounding environment is bothersome. In the case where the right-side housing 12 of the sound output device 1B illustrated in FIG. 6 includes a second outputter 22 of the inner-ear or clip-on type, a gap is formed between the second outputter 22 and the right ear E2 of the user U. Consequently, in such a case, a fair amount of the sound of the surrounding environment may enter the right ear E2 of the user U.

Accordingly, the controller 40 may cause the second outputter 22 on the right ear E2 side to output sound that includes certain masking sound while the user U is making the feature to cover the left ear E1. Hereinafter, sound that includes certain masking sound is also referred to as "second sound" out of convenience. The certain masking sound may be any type of sound that inhibits perception of the sound of the surrounding environment entering the right ear E2 of the user U. Inhibited perception of the sound of the surrounding environment may be that the sound of the surrounding environment feels reduced to the right ear E2 of the user U. For example, the certain masking sound may be at least one from among white noise, brown noise, pink noise, and the like. The certain masking sound may include, for example, sound in accordance with the frequency characteristics of the sound of the surrounding environment of the second outputter 22. The certain masking sound may include, for example, sound having frequency characteristics in accordance with the frequency characteristics of the sound of the surrounding environment of the second outputter 22. For example, the controller 40 may analyze the frequency characteristics of the sound of the surrounding environment detected by the second detector 32 and cause the second outputter 22 to output sound that would mask sound with those frequency characteristics.

To reduce how much the certain masking sound stands out as sound, the certain masking sound may be sound that is quieter than at least one of the sound outputted from the first outputter 21 (that is, the first sound) or the sound of the surrounding environment of the second outputter 22 (acquired by the second detector 32), for example.

Figure 7:
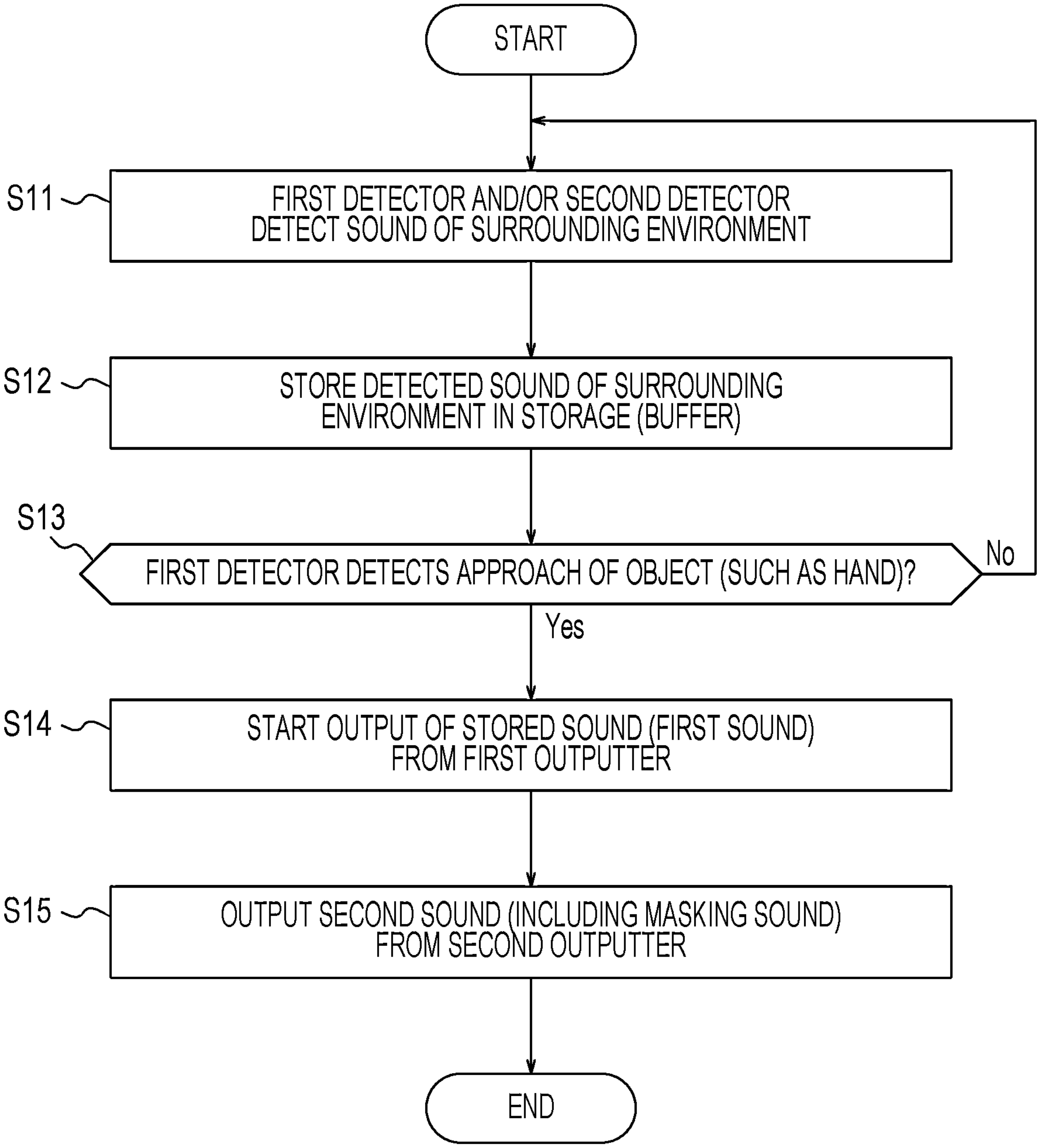
FIG. 7 is a flowchart for explaining an example of operations by a sound output device according to an embodiment.

FIG. 7 is a flowchart for explaining an example of operations by the sound output device 1 according to an embodiment. The following further describes operations by the sound output device 1 according to an embodiment, with reference to FIG. 7. The following control may be control (operations) executed by the controller 40 of the sound output device 1.

At the time when the operations illustrated in FIG. 7 start, as described above, the sound output device 1 may be outputting certain sound or the like, or not outputting any sound at all. Consequently, at the time when the operations illustrated in FIG. 7 start, the controller 40 may perform control related to the presence or absence of certain sound outputted from the first outputter 21 and/or the second outputter 22.

When the operations illustrated in FIG. 7 start, the first detector 31 and/or the second detector 32 detects the sound of the surrounding environment of the sound output device 1 (step S11).

The controller 40 stores the sound of the surrounding environment detected by the first detector 31 and/or the second detector 32 as data in the storage 50 (step S12).

The controller 40 determines whether or not the first detector 31 detects the approach of an object such as the hand of the user U (step S13). If the approach of an object such as the hand of the user U is not detected, the controller 40 returns to step S11 and continues the process.

In contrast, if the approach of an object such as the hand of the user U is detected in step S13, the controller 40 starts output (playback), from the first outputter 21, of the sound (of the surrounding environment) (first sound) based on the data stored in the storage 50 (step S14). The controller 40 may play the sound (of the surrounding environment) based on the data stored in the storage 50 sequentially and continuously, in segments of time such as every 3 or 5 seconds, for example. As described above, the first sound may be sound that includes at least one of certain playback sound or certain call audio.

The controller 40 controls the second outputter 22 to output second sound during the output of the first sound from the first outputter 21 (step S15). The second sound may be sound that includes certain masking sound. After step S15, the controller 40 may restart the operations illustrated in FIG. 7.

In this way, in the sound output device 1 according to one embodiment, the controller 40 controls the first outputter 21 to output the first sound and controls the second outputter 22 to output the second sound on the basis of the first detector 31 detecting the approach of the user's hand for example. The controller 40 may also output, as the first sound, sound that includes the sound of the surrounding environment of the sound output device 1 stored in the storage 50.

In one embodiment, the controller 40 may start the output of the second sound by the second outputter 22 on the basis of the start of the output of the first sound by the first outputter 21. In this case, the controller 40 may end the output of the second sound by the second outputter 22 on the basis of the end of the output of the first sound by the first outputter 21.

As illustrated in FIG. 6, when the user U feels that the sound outputted by the first outputter 21 is bothersome or wants to pay attention to the sound of the surrounding environment, for example, the user U may make a gesture of using a hand or the like to cover the ear on the side of the first outputter 21 that is outputting sound. In this case, the sound of the surrounding environment is played back from slightly earlier from the first outputter 21 on the side covered by the hand. Masking sound is outputted from the second outputter 22 on the side not covered by the hand. Consequently, according to the sound output device 1, the user can make a gesture of covering the left ear E1 for example to pay attention (direct awareness) to the sound of the surrounding environment that the user may have failed to hear.

The example illustrated in FIG. 6 is used to describe the case where the user U makes a gesture of covering the left ear E1. The following describes the case where the user U makes a gesture of covering the right ear E2.

Figure 8:
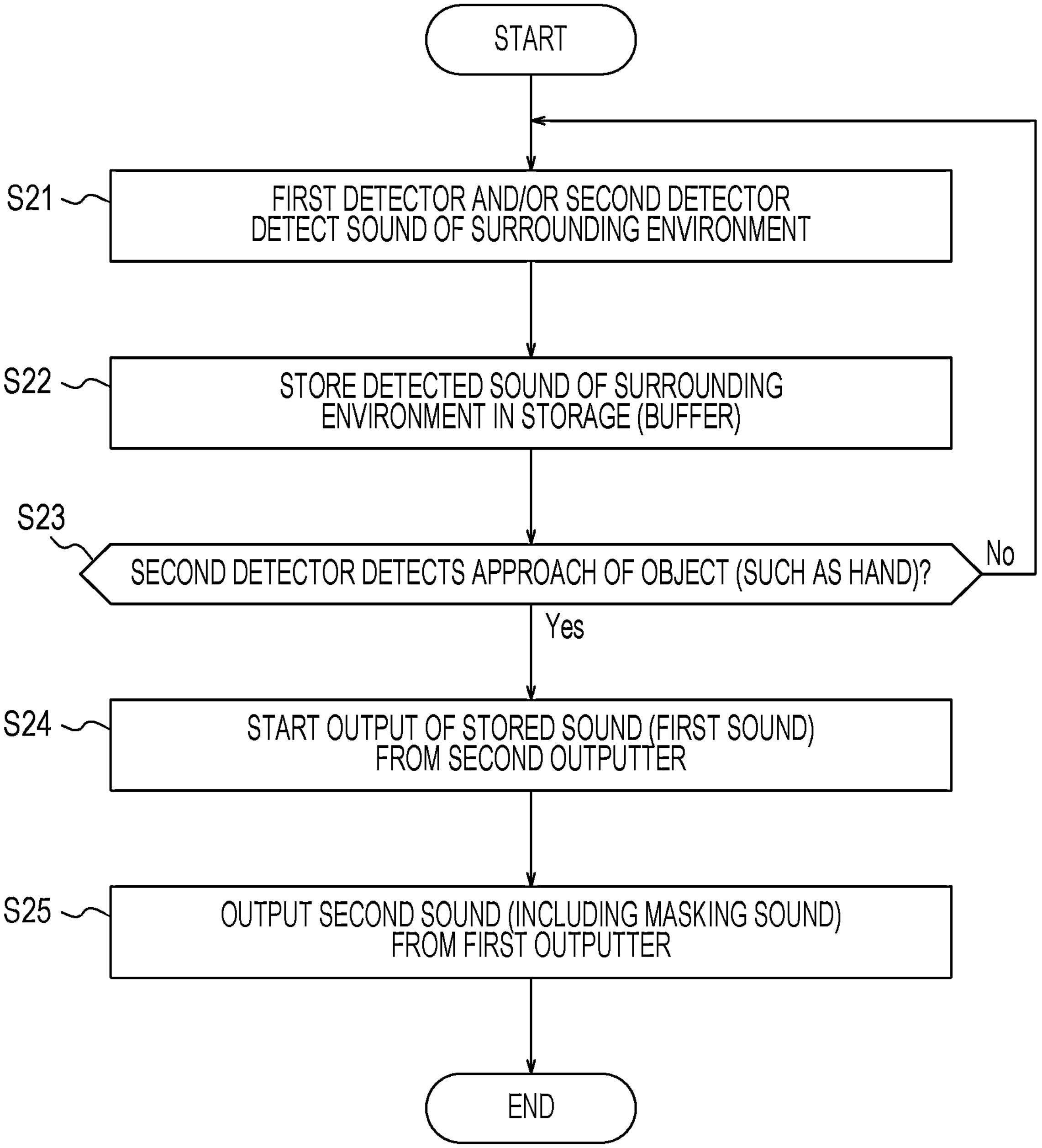
FIG. 8 is a flowchart for explaining an example of operations by a sound output device according to an embodiment.

FIG. 8 is a flowchart for explaining an example of operations by the sound output device 1 according to an embodiment in the case where the user U makes a gesture of covering the right ear E2. The following describes operations that differ from the operations described in FIG. 7. The following simplifies or omits the description of operations which are the same and/or similar to the operations already described in FIG. 7.

When the operations illustrated in FIG. 8 start, steps S21 and S22 may be the same and/or similar to steps S11 and S12 described in FIG. 7.

The controller 40 determines whether or not the second detector 32 detects the approach of an object such as the hand of the user U (step S23). If the approach of an object such as the hand of the user U is not detected, the controller 40 returns to step S21 and continues the process.

In contrast, if the approach of an object such as the hand of the user U is detected in step S23, the controller 40 starts output (playback), from the second outputter 22, of the sound (of the surrounding environment) (first sound) based on the data stored in the storage 50 (step S24). The controller 40 may play the sound (of the surrounding environment) based on the data stored in the storage 50 sequentially and continuously, in segments of time such as every 3 or 5 seconds, for example.

The controller 40 controls the first outputter 21 to output second sound during the output of the first sound from the second outputter 22 (step S25). The second sound may be sound that includes certain masking sound. After step S25, the controller 40 may restart the operations illustrated in FIG. 8.

In this way, in the sound output device 1 according to one embodiment, the controller 40 may control the second outputter 22 to output the first sound and controls the first outputter 21 to output the second sound on the basis of the second detector 32 detecting the approach of the user's hand for example.

According to the sound output device 1 as in one embodiment, the user U making a gesture of covering the right ear E2 with the right hand for example results in the same and/or similar effects as the embodiment described above.

The following describes operations in the case of using the sound output device 1 to make a phone call.

Figure 9:
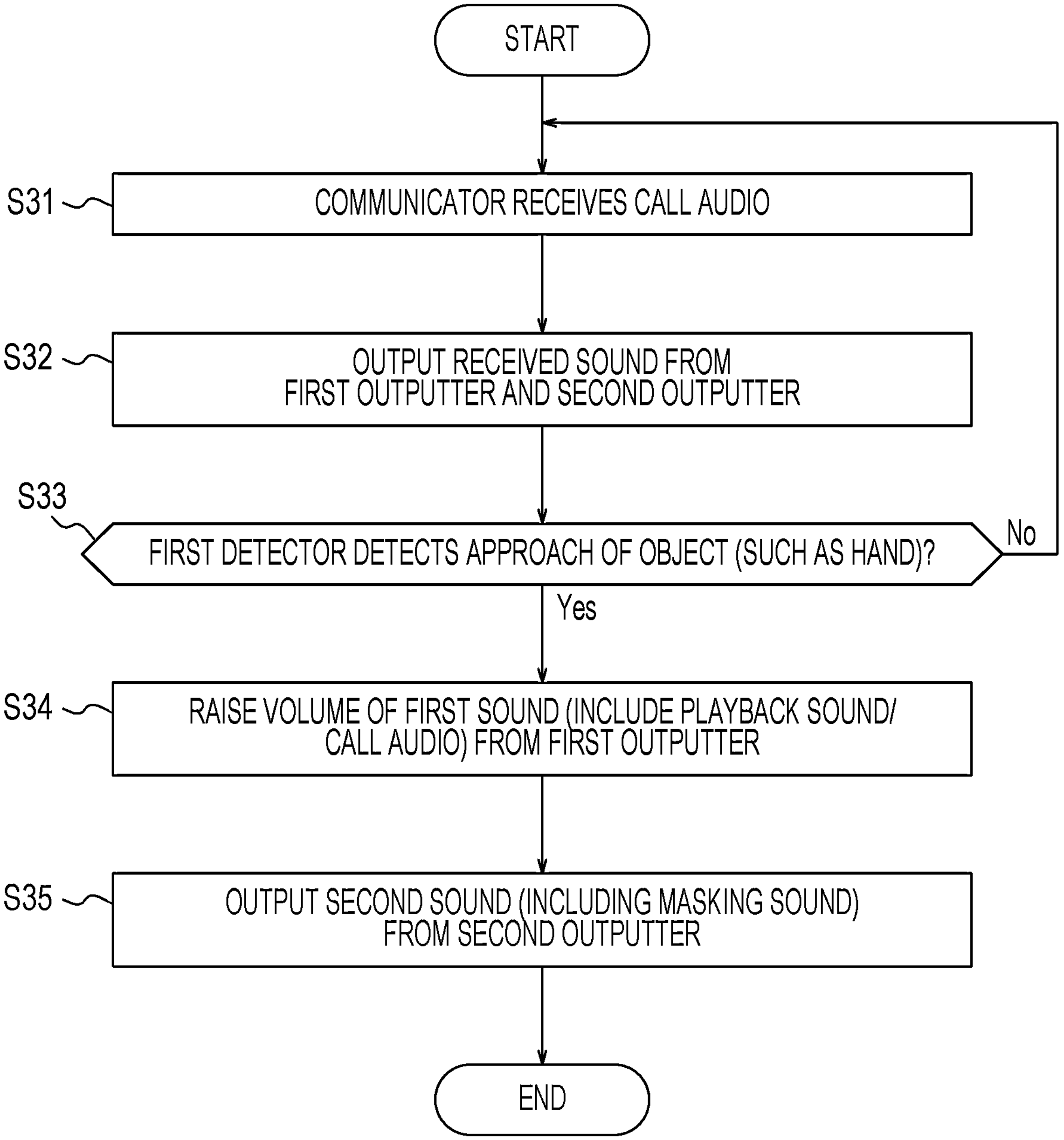
FIG. 9 is a flowchart for explaining an example of operations by a sound output device according to an embodiment.

FIG. 9 is a flowchart for explaining an example of operations by the sound output device 1 according to an embodiment in the case of using the sound output device 1 to make a phone call. The following describes operations that differ from the operations described in FIG. 7 or 8. The following simplifies or omits the description of operations which are the same and/or similar to the operations already described in FIG. 7 or 8.

When the operations illustrated in FIG. 9 start, the communicator 60 receives the data of a voice call transmitted from another electronic apparatus for example (step S31).

The controller 40 outputs from the first outputter 21 and the second outputter 22 the sound of the call audio based on the data received in step S31 (step S32).

The controller 40 determines whether or not the first detector 31 detects the approach of an object such as the hand of the user U (step S33). If the approach of an object such as the hand of the user U is not detected, the controller 40 returns to step S31 and continues the process.

In contrast, if the approach of an object such as the hand of the user U is detected in step S33, the controller 40 raises the volume of the first sound outputted from the first outputter 21 (step S34).

The controller 40 controls the second outputter 22 to output second sound during the output of the first sound from the first outputter 21 (step S35). After step S35, the controller 40 may restart the operations illustrated in FIG. 9.

In the sound output device 1 according to one embodiment, the controller 40 may output, as the first sound, sound that includes sound received from another electronic apparatus for example.

The following further describes gesture detection by the first detector 31 and the second detector 32 of the sound output device 1 according to one embodiment.

First, the following describes the case where the first detector 31 and the second detector 32 include a microphone that picks up the sound of the surrounding environment of the left-side housing 11 and the right-side housing 12, respectively.

The applicant has confirmed that the characteristics of the sound detected by the first detector 31 changes between the case where the user U is not covering the left ear E1 for example with a hand or the like, as illustrated in FIG. 2, and the case where the user U is covering the left ear E1 for example with the left hand LH, as illustrated in FIG. 6.

Figure 10A:
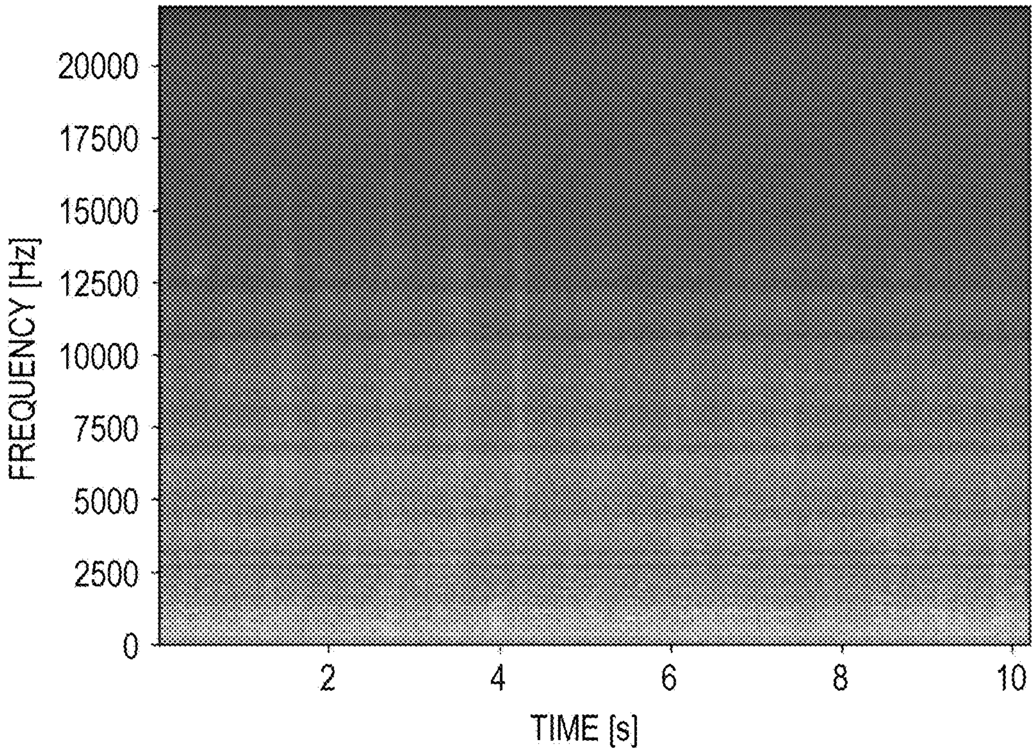
FIG. 10A is a diagram illustrating an example of detection by a detector of a sound output device according to an embodiment.
Figure 10B:
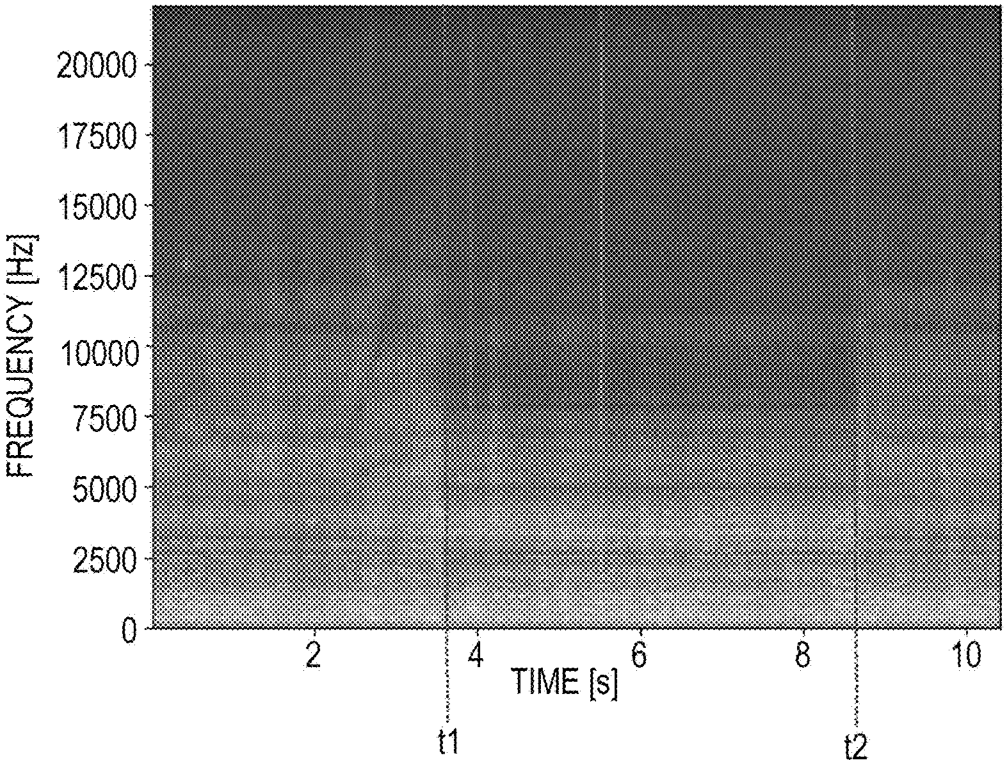
FIG. 10B is a diagram illustrating an example of detection by a detector of a sound output device according to an embodiment.

FIGS. 10A and 10B illustrate changes over time in the frequency of the sound (of the surrounding environment) that the first detector 31 detects. In FIGS. 10A and 10B, the horizontal axis represents elapsed time and the vertical axis represents the frequency of sound. In FIGS. 10A and 10B, the portions of light color (close to white) indicate that sound of the corresponding frequency is detected, while the portions of dark color (close to black) indicate that sound of the corresponding frequency is not detected.

FIG. 10A illustrates the frequency of the sound (of the surrounding environment) that the first detector 31 detects when the user U does not cover the left ear E1 for example with a hand or the like. In contrast, FIG. 10B illustrates the frequency of the sound (of the surrounding environment) that the first detector 31 detects when the user U covers the left ear E1 for example with a hand or the like. In FIG. 10B, the time period from time t1 to time t2 indicates when the user U is covering the left ear E1 with a hand or the like. That is, the user U is not covering the left ear E1 with a hand or the like before time t1 and after time t2.

A comparison of FIGS. 10A and 10B reveals that the two graphs have a characteristic difference. Namely, the graphs show that a detectable change occurs in the frequency of the sound detected by the first detector 31 between the cases where the user U is covering and not covering the left ear E1 for example with a hand or the like. In FIG. 10B, sound of relatively low frequency, such as 8000 Hz or lower, undergoes little or no change in the time period from time t1 to time t2. In contrast, in FIG. 10B, sound of relatively high frequency, such as 8000 Hz or higher, is cut in the time period from time t1 to time t2.

The above result demonstrates that when the user U covers the left ear E1 for example with a hand or the like, sound of relatively high frequency detected by the first detector 31 is cut. Consequently, whether or not the user U is covering the left ear E1 for example with a hand or the like can be determined on the basis of the component of relatively high frequency of the sound detected by the first detector 31.

In this way, in one embodiment, the controller 40 may control the first outputter 21 to output the first sound and control the second outputter 22 to output the second sound on the basis of the first detector 31 detecting that an object such as the user's hand is covering at least a portion of the first outputter 21. In one embodiment, the first detector 31 may be configured as a first sound pickup that picks up first external sound around the first outputter 21. In this case, the controller 40 may control the first outputter 21 to output the first sound and control the second outputter 22 to output the second sound on the basis of a certain change (of frequency, for example) in the first external sound picked up by the first sound pickup.

In the embodiment described above, the first detector 31 detects that the hand of the user U is covering at least a portion of the first outputter 21, but is not limited thereto. More specifically, the first detector 31 may also detect that any of various types of objects, such as paper, boards, cloth, and bowls, is covering at least a portion of the first outputter 21.

The following describes the case where the first detector 31 and the second detector 32 include a proximity sensor capable of detecting an object approaching the left-side housing 11 and the right-side housing 12, respectively. In the case where the first detector 31 and the second detector 32 include a proximity sensor, the first detector 31 and the second detector 32 can directly detect that the user's hand or the like approaches the first detector 31 and the second detector 32, respectively.

Other Embodiments

The following describes another embodiment according to the present disclosure.

Figure 11:
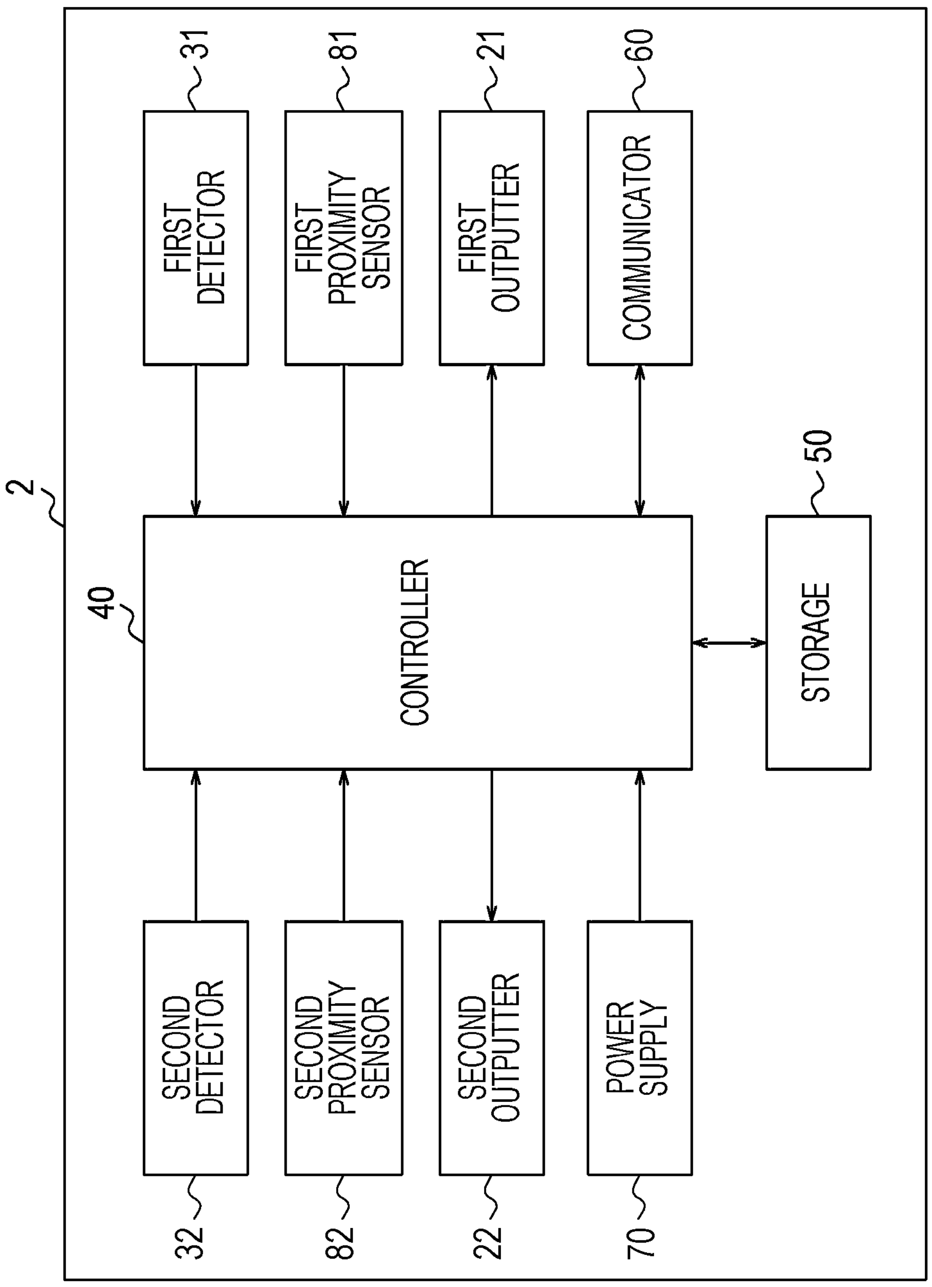
FIG. 11 is a block diagram illustrating a functional schematic configuration of a sound output device according to an embodiment.

FIG. 11 is a block diagram schematically illustrating a functional configuration of a sound output device according to another embodiment.

In the sound output device 1 illustrated in FIG. 5, the first detector 31 and the second detector 32 are assumed to be configured using a microphone or a proximity sensor. However, the case of using a microphone for example to detect the user U making a gesture of holding up a hand necessitates a determination based on the change of sound over time. Consequently, detecting the user U making a gesture of holding up a hand takes some amount of time. Accordingly, as in the sound output device 2 illustrated in FIG. 11, the configuration may include a first proximity sensor 81 and a second proximity sensor 82 in addition to the first detector 31 and the second detector 32 configured as a microphone. This configuration can allow for improved accuracy in detecting whether or not the user U makes a gesture of holding up a hand.

Figure 12:
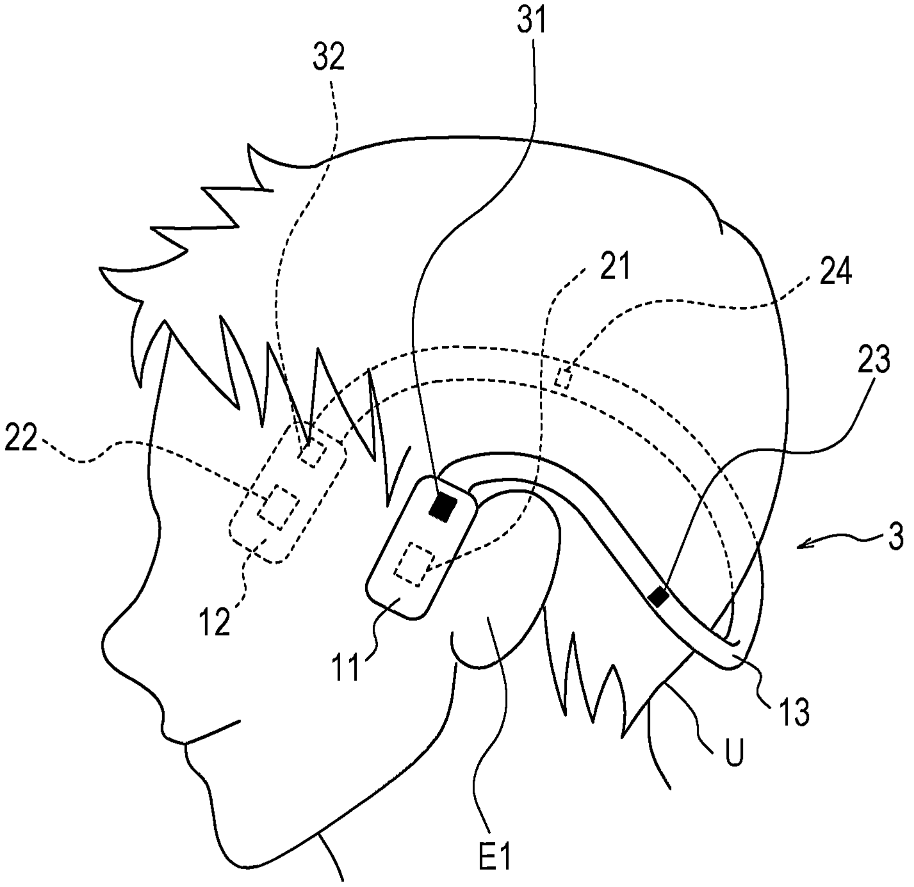
FIG. 12 is a diagram illustrating an example of a usage pattern of a sound output device according to an embodiment.

FIG. 12 is a diagram illustrating an example of a usage pattern of a sound output device according to another embodiment.

The sound output device 3 illustrated in FIG. 12 may differ from the sound output device 1C illustrated in FIG. 3 by including a third outputter 23 at a position somewhat apart from the first detector 31. In FIG. 12, the third outputter 23 is disposed on the headband 13 at a position somewhat apart from the first detector 31. However, the third outputter 23 may also be disposed on a member other than the headband 13. Although omitted from illustration in FIG. 12, on the right side in the same and/or similar manner for example, a fourth outputter 24 may also be disposed on the headband 13 or the like at a position somewhat apart from the second detector 32.

The third outputter 23 and the fourth outputter 24 may output certain sound, such as noise for example, that the first detector 31 and the second detector 32 (microphones) can detect, respectively. For example, when the user U is not making a gesture of holding up a hand to the left ear E1, the first detector 31 clearly detects the certain sound such as noise outputted from the third outputter 23. In contrast, when the user U is making a gesture of holding up a hand to the left ear E1, the first detector 31 does not detect, or detects relatively weakly, the certain sound such as noise outputted from the third outputter 23. Consequently, this configuration may determine whether or not the user U is making a gesture of holding up a hand to the left ear E1 on the basis of the level at which the first detector 31 detects the certain sound such as noise outputted from the third outputter 23.

Figure 13:
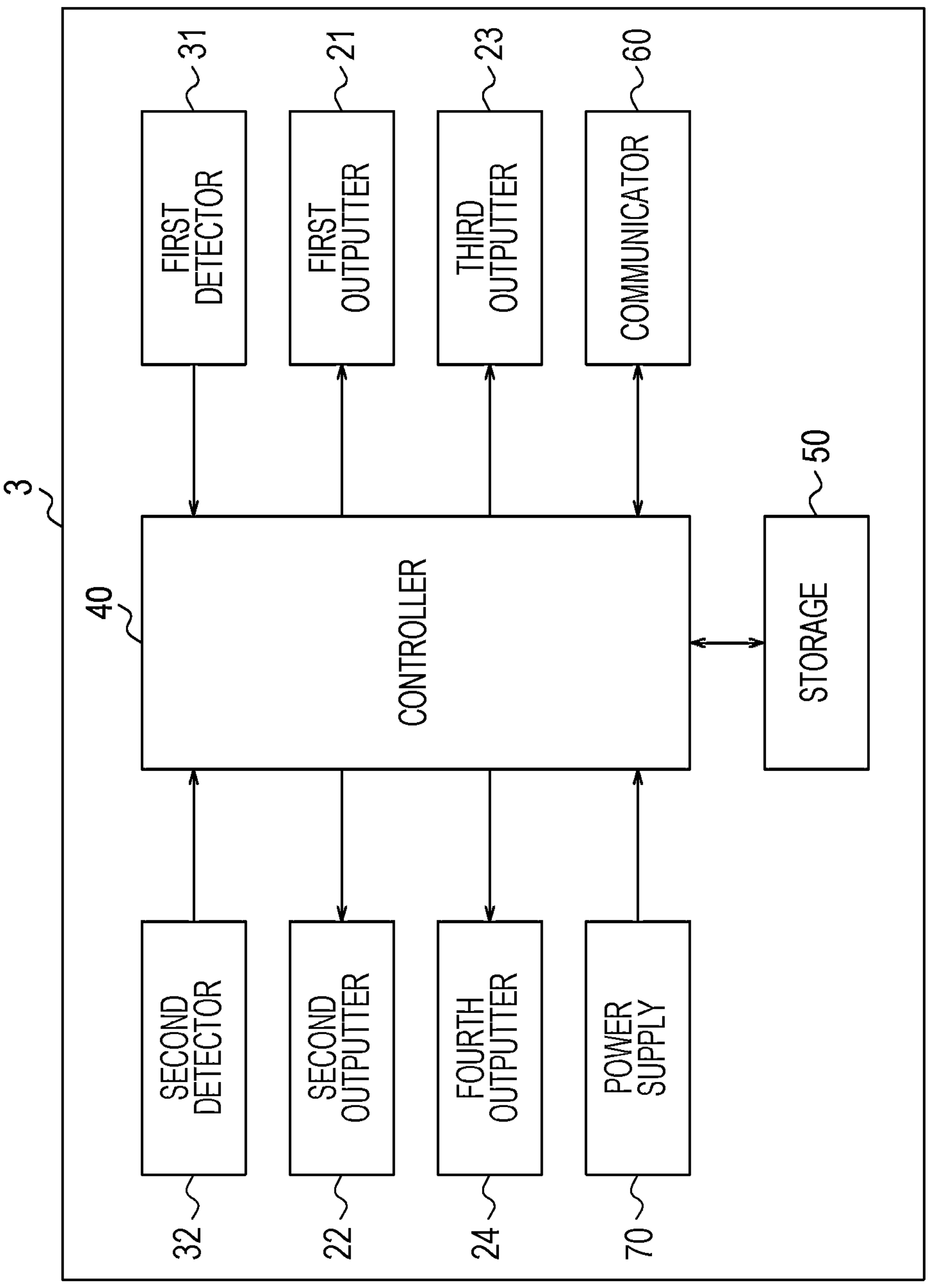
FIG. 13 is a block diagram illustrating a functional schematic configuration of a sound output device according to an embodiment.

FIG. 13 is a block diagram schematically illustrating a functional configuration of a sound output device according to this other embodiment. The sound output device 3 illustrated in FIG. 13 may differ from the sound output device 1 illustrated in FIG. 5 by including the third outputter 23 and the fourth outputter 24. The third outputter 23 and the fourth outputter 24 may have the same and/or similar configuration as, for example, the first outputter 21 and the second outputter 22, respectively. The controller 40 may control the third outputter 23 and the fourth outputter 24 to output certain noise or other sound. The sound output device 3 illustrated in FIG. 13 may further include a proximity sensor like the first proximity sensor 81 and/or the second proximity sensor 82, as in the sound output device 2 illustrated in FIG. 11.

The present disclosure has been described on the basis of the drawings and examples, but note that a person skilled in the art could easily make various modifications or revisions on the basis of the present disclosure. Consequently, it should be understood that these modifications or revisions are included in the scope of the present disclosure. For example, the functions and the like included in each functional unit may be rearranged in logically non-contradictory ways. Multiple functional units or the like may be combined into one, or a functional unit may be divided. Each embodiment according to the present disclosure described above is not limited to being carried out exactly according to each embodiment as described, and may be carried out by combining features or omitting some features, as appropriate. In other words, the content of the present disclosure enables a person skilled in the art to make various variations and revisions on the basis of the present disclosure. Therefore, these variations and revisions are included in the scope of the present disclosure. For example, in each embodiment, each functional unit, means, step, or the like can be added to another embodiment or replaced by each function unit, means, step, or the like of another embodiment in logically non-contradictory ways. In each embodiment, multiple functional units, means, steps, or the like can be combined into one, or each functional unit, means, step, or the like can be divided. Each embodiment according to the present disclosure described above is not limited to being carried out exactly according to each embodiment as described, and can be carried out by combining features or omitting some features, as appropriate.

For example, one possible embodiment causes a general-purpose computer to function as the sound output device 1 according to an embodiment described above. Specifically, a program describing processing content to be realized by each function of the sound output device 1 according to an embodiment described above is stored in a memory of the general-purpose computer, and a processor reads out and executes the program. Consequently, the present disclosure is also realizable as a processor-executable program or as a non-transitory computer-readable medium storing the program.

Appendix 1

A sound output device comprising:

a first outputter configured to output sound to one ear of a user;

a second outputter configured to output sound to the other ear of the user;

a first detector configured to detect an approach of an object in a vicinity of the first outputter; and a controller configured to cause the first outputter to output first sound including at least one of certain playback sound or certain call audio and cause the second outputter to output second sound including certain masking sound on a basis of the first detector detecting the approach of the object.

Appendix 2

The sound output device according to appendix 1, further comprising:

a second detector configured to detect an approach of an object in a vicinity of the second outputter, wherein the controller is configured to cause the second outputter to output the first sound and cause the first outputter to output the second sound on a basis of the second detector detecting the approach of the object.

Appendix 3

The sound output device according to appendix 1, wherein the controller is configured to cause the first outputter to output the first sound and cause the second outputter to output the second sound on a basis of the first detector detecting that the object covers at least a portion of the first outputter.

Appendix 4

The sound output device according to any one of appendices 1 to 3, wherein the controller is configured to cause the second outputter to start output of the second sound on a basis of the first outputter starting output of the first sound, and cause the second outputter to end output of the second sound on a basis of the first outputter ending output of the first sound.

Appendix 5

The sound output device according to any one of appendices 1 to 4, wherein the controller is configured to output the second sound as sound that is quieter than at least one of the first found or sound of a surrounding environment of the second outputter.

Appendix 6

The sound output device according to any one of appendices 1 to 5, wherein the controller is configured to output the second sound as sound in accordance with frequency characteristics of sound of a surrounding environment of the second outputter.

Appendix 7

The sound output device according to appendix 6, wherein the controller is configured to output the second sound as sound having frequency characteristics in accordance with the frequency characteristics of the sound of the surrounding environment of the second outputter.

Appendix 8

The sound output device according to any one of appendices 1 to 7, further comprising:

storage configured to store sound of a surrounding environment of the first outputter, wherein the controller is configured to output, as the first sound, sound that includes the sound of the surrounding environment stored in the storage.

Appendix 9

The sound output device according to any one of appendices 1 to 8, further comprising:

a communicator configured to communicate with another electronic apparatus, wherein the controller is configured to output, as the first sound, sound received from the other electronic apparatus.

Appendix 10

A sound output device comprising:

a first outputter configured to output sound to one ear of a user;

a second outputter configured to output sound to the other ear of the user;

a first sound pickup configured to pick up first external sound around the first outputter; and a controller configured to cause the first outputter to output first sound including at least one of certain playback sound or certain call audio and cause the second outputter to output second sound including certain masking sound on a basis of a certain change in the first external sound picked up by the first sound pickup.

Appendix 11

A sound output method comprising:

detecting, by a first detector, an approach of an object in a vicinity of a first outputter; and causing the first outputter to output first sound including at least one of certain playback sound or certain call audio and causing a second outputter to output second sound including certain masking sound on a basis of the first detector detecting the approach of the object.

Appendix 12

A program causing an electronic apparatus to execute processing comprising:

detecting, by a first detector, an approach of an object in a vicinity of a first outputter; and causing the first outputter to output first sound including at least one of certain playback sound or certain call audio and causing a second outputter to output second sound including certain masking sound on a basis of the first detector detecting the approach of the object.

What is claimed is:

1. A sound output device comprising:

a first outputter configured to output a first sound to one ear of a user;

a second outputter configured to output a second sound to the other ear of the user;

a storage configured to continuously store ambient sound;

a first detector configured to detect an approach of an object in a vicinity of the first outputter; and a controller configured to, on a basis of the first detector detecting the approach of the object:

extract an audio portion from the storage starting from a point in time a few seconds prior to the detection;

cause the first outputter to output the first sound including the audio portion; and cause the second outputter to output the second sound including a masking sound.

2. The sound output device according to claim 1, further comprising:

a second detector configured to detect an approach of an object in a vicinity of the second outputter, wherein the controller is configured to cause the second outputter to output the first sound and cause the first outputter to output the second sound on a basis of the second detector detecting the approach of the object.

3. The sound output device according to claim 1, wherein the controller is configured to cause the first outputter to output the first sound and cause the second outputter to output the second sound on a basis of the first detector detecting that the object covers at least a portion of the first outputter.

4. The sound output device according to claim 1, wherein the controller is configured to cause the second outputter to start output of the second sound on a basis of the first outputter starting output of the first sound, and cause the second outputter to end output of the second sound on a basis of the first outputter ending output of the first sound.

5. The sound output device according to claim 1, wherein the controller is configured to output the second sound as a sound that is quieter than at least one of the first sound or an ambient sound of a surrounding environment of the second outputter.

6. The sound output device according to claim 1, wherein the controller is configured to output the second sound as a sound in accordance with frequency characteristics of an ambient sound of a surrounding environment of the second outputter.

7. The sound output device according to claim 1, further comprising:

storage configured to store an ambient sound of a surrounding environment of the first outputter, wherein the controller is configured to output, as the first sound, a sound that includes the ambient sound of the surrounding environment stored in the storage.

8. The sound output device according to claim 1, further comprising:

a communicator configured to communicate with another electronic apparatus, wherein the controller is configured to output, as the first sound, a sound received from the other electronic apparatus.

9. A sound output method comprising:

continuously storing ambient sound in a storage;

detecting, by a first detector, an approach of an object in a vicinity of a first outputter; and on a basis of the first detector detecting the approach of the object:

extracting an audio portion from the storage starting from a point in time a few seconds prior to the detection, causing the first outputter to output a first sound including the audio portion, and causing a second outputter to output a second sound including a masking sound.

10. A non-transitory computer-readable recording medium storing a computer program, the program causing an electronic apparatus to execute processing comprising:

continuously storing ambient sound in a storage;

detecting, by a first detector, an approach of an object in a vicinity of a first outputter; and on a basis of the first detector detecting the approach of the object:

extracting an audio portion from the storage starting from a point in time a few seconds prior to the detection, causing the first outputter to output a first sound including the audio portion, and causing a second outputter to output a second sound including a masking sound.

* * * * *